(12) United States Patent
Hotelling et al.

(10) Patent No.: US 7,154,477 B1
(45) Date of Patent: Dec. 26, 2006

(54) HYBRID LOW POWER COMPUTER MOUSE

(75) Inventors: Steve Hotelling, San Jose, CA (US);
Joshua Strickon, San Jose, CA (US);
Brian Huppi, San Francisco, CA (US);
Christoph Krah, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 435 days.

(21) Appl. No.: 10/605,042

(22) Filed: Sep. 3, 2003

(51) Int. Cl.
*G09G 5/08* (2006.01)

(52) U.S. Cl. ...................................................... 345/166

(58) Field of Classification Search ........ 345/156–167; 463/36–39
See application file for complete search history.

(56) References Cited

U.S. PATENT DOCUMENTS 5,805,144 A * 9/1998 Scholder et al. ............. 345/163
6,351,257 B1 * 2/2002 Liu ............................ 345/163

* cited by examiner

*Primary Examiner*—Richard Hjerpe
*Assistant Examiner*—Michael Pervan
(74) *Attorney, Agent, or Firm*—Beyer Weaver & Thomas, LLP (57) ABSTRACT

A low power tracking device and a method of use thereof is described. The method includes receiving first tracking information from a first tracking device and periodically determining accuracy of the first tracking information. A second tracking device is activated and used to acquire second tracking information when said determining indicates that the accuracy of the first tracking information is inadequate. The first tracking device is substantially lower power device that the second tracking device.

42 Claims, 6 Drawing Sheets

HYBRID LOW POWER COMPUTER MOUSE

BACKGROUND OF INVENTION

This invention relates generally to low power user input devices. More specifically, the invention describes an ultra low power computer mouse having an optical tracking engine and inertial tracking engine that cooperate to provide velocity data to a computing device.

A computer mouse is a small device that a computer user pushes across a desk surface in order to point to a place on a display screen and to select one or more actions to take from that position. The mouse first became a widely-used computer tool when Apple Computer Inc. of Cupertino Calif. made it a standard part of the Apple Macintosh line of computers. Until the late 1990s, most computer mice were opto-mechanical in nature that required a number of moving parts to work in tandem with some form of optical emitters/receiving device (such as an infrared LED/infrared sensor) to provide tracking information to a processor coupled thereto arranged to generate coordinate data that is used to move an on-screen icon (such as a pointer). Since this process is repeated hundreds of times a second, the motion perceived by a computer user is smooth and continuous.

The use of mechanical components in the computer mouse limited the use of the computer mouse. However, towards the end of the 1990s, Agilent Technologies developed and introduced a purely optical mouse that in its first incarnation used a tiny camera that took over 1500 images every second to provide the requisite tracking information enabling the optical mouse to operate on almost any surface. Typically, the optical mouse includes a small, light emitting diode (LED) that bounces a beam of light off of a surface onto which the mouse was placed to be received by a light sensor (typically a CMOS type sensor). The CMOS sensor, in turn, transmitted each of the images to a digital signal processor (DSP) for subsequent analysis. Such analysis includes detecting patterns in the images and how these patterns moved since most recent previous image. The observed change in patterns over a sequence of images provides the requisite input data for the DSP to determine how far the mouse has moved which is then provided to a processor that calculates the corresponding coordinates for a computing device coupled thereto.

Since it was now possible to use an optical mouse on most surfaces, a next step in the evolution of the computer mouse resulted in a wireless mouse connected to the computing device only by way of a wireless link. Such wireless links include those based upon the Bluetooth specification which is a computing and telecommunications industry specification that describes how mobile phones, computers, and personal digital assistants (PDAs) can easily interconnect with each other and with home and business phones and computers using a short-range wireless connection.

Although a wireless optical computer mouse provides great flexibility to the computer user, one weak point of currently configured wireless computer mice is the relatively short battery life due primarily to the large power consumption of the optical tracking engine and wireless link. For example, a Bluetooth wireless mouse with the industry standard optical tracking sensor (i.e., the Agilent 2030 manufactured by Agilent Inc of Palo Alto, Calif.) draws approximately 35 mA from the on-board batteries (usually standard AA batteries) when in the active mode while the associated Bluetooth/microprocessor chip draws on the average of 7 mA for a total of approximately 40 mA in active mode. A power consumption of this magnitude translates into approximately a 2 month battery life creating an inconvenience for the user not to mention the cost of replacing the batteries at such frequent intervals. One solution to the problem involves substituting rechargeable batteries but this, of course, necessitates the use of a recharging station.

Therefore, what is required is a low power tracking solution. One such low power tracking solution is a hybrid computer mouse having both a low power accelerometer used in combination with an optical tracking engine to provide velocity or relative positional data with low tracking errors over a wide range of use.

SUMMARY OF INVENTION

The invention described herein pertains to a wireless low power tracking device and methods of use thereof. In one embodiment, a method for operating a pointing device in a low power manner is described. The method includes receiving first tracking information from a first tracking device and periodically determining accuracy of the first tracking information. A second tracking device is activated and used to acquire second tracking information when said determining indicates that the accuracy of the first tracking information is inadequate. The first tracking device is substantially lower power device than the second tracking device.

In another embodiment, a hybrid tracking system suitably arranged to provide tracking information to a computer is described. The system includes an optical tracking engine arranged to provide the tracking information to the computer, a low power inertial tracking engine arranged to provide the tracking information to the computer, and an adaptive duty cycle signal generator coupled to the optical tracking engine and the inertial tracking engine. In the described embodiment, the adaptive duty cycle generator is arranged to compare tracking information provided by the accelerometer and provided by the optical tracking engine. When the comparison is valid, the adaptive duty cycle signal generator provides a first duty cycle signal that deactivates the optical tracking engine such that only the low power tracking engine provides the tracking information to the computer.

In yet another embodiment, computer program product for operating a pointing device in a low power manner is described that includes computer code for receiving first tracking information from a first tracking device, computer code for periodically determining accuracy of the first tracking information, computer code for activating and using a second tracking device to acquire second tracking information when said determining indicates that the accuracy of the first tracking information is inadequate, wherein the first tracking device is substantially lower power device that the second tracking device. The computer code is then stored in a computer readable medium.

BRIEF DESCRIPTION OF DRAWINGS

The invention will be better understood by reference to the following description taken in conjunction with the accompanying drawings.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Although typical accelerometers are low power, they are susceptible to large tracking errors due to drift and other sources of error due to, for example, surface irregularities. Such tracking errors can be substantial after a fairly short length of time (approximately 0.5 seconds in some cases) thereby limiting the usefulness of an inertial tracking engine based computer mouse. On the other hand, low power optical tracking engines (such as, for example, the Agilent 2030) have difficulty compensating for high acceleration therefore limiting their usefulness to low acceleration (typically on the order of 0.15 G) situations.

Attempts to implement a low power computer mouse using only a low power optical tracking engine are not practicable due to the large tracking errors introduced when the computer mouse is accelerated much beyond 0.15 G as well as low power being only "lower power" that still substantially reduces on-board battery life. This extremely small range of acceptable acceleration can be appreciated when normal hand motions can induce accelerations on the order to 3 G. On the other hand, attempting to implement a low power computer mouse using a conventional accelerometer is also impractical due to the large induced tracking errors after only a short time of use especially in low acceleration cases where the signal to noise (S/N) ratios can be quite low.

The inventive computer mouse solves these problems by combining both an optical tracking engine and an accelerometer into a hybrid low power computer mouse having low power consumption requirements and long battery life. Accordingly, in a particularly useful implementation, a wireless computer mouse having an accelerometer and an optical tracking engine cooperate with each other to provide the tracking information to a computer is described. In the described embodiment, the optical tracking engine is inactive while the accelerometer is always active so as to provide continuous dead reckoning tracking information. The dead reckoning tracking information is periodically calibrated using optical tracking information provided by the now activated optical tracking engine.

For those periods of time that a dead reckoning tracking error measurement (being a difference between the dead reckoning tracking information and the optical tracking information) is greater than a pre-determined threshold, the optical tracking engine remains active to provide the optical tracking information to the computer. During these periods of time, an accumulated error value is calculated based upon a comparison of the optical tracking information and the dead reckoning tracking information that is used to reset an offset value associated with the accelerometer. By resetting the offset value, the overall accumulated error between the inertial tracking engine and the optical tracking engine is reduced.

At any time, a surface sensor monitors a surface pressure and/or a surface quality to determine whether or not the computer mouse is in contact with a suitable surface. In those situations where the computer mouse in not in contact with a suitable surface, both the accelerometer and the optical tracking engine are deactivated until such time as the sensor has determined that the computer mouse has been placed back on a suitable surface. It is contemplated that the surface sensor can be either a mechanical type sensor, an electro-mechanical type sensor, or an optical type sensor any of which would be well suited for use with the computer mouse described herein.

The invention will now be described in terms of a representative wireless computer mouse that should not be construed to limit either the scope or intent of the invention. It should be noted as well that the invention, although described in terms of a computer mouse, can be well adapted to any input device for providing any form of absolute or relative tracking information to a computing device.

Figure 1:
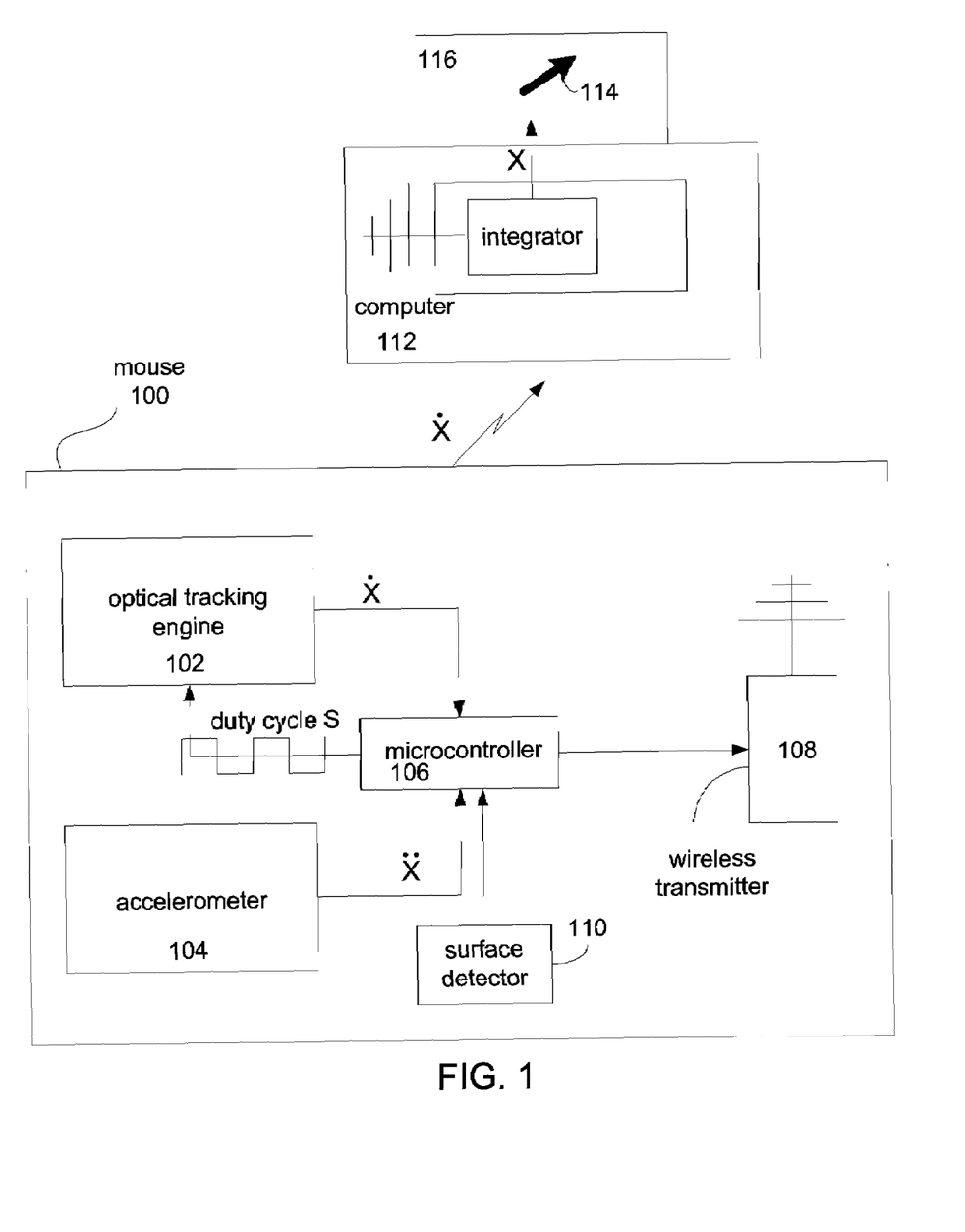
FIG. 1 shows a block diagram of an exemplary wireless hybrid computer mouse in accordance with an embodiment of the invention.

Accordingly, FIG. 1 shows a representative computer mouse 100 in accordance with an embodiment of the invention. The mouse 100 includes an optical tracking engine 102 and an accelerometer 104 each of which is coupled to a microcontroller unit 106. It should be noted that the accelerometer 104 and the optical tracking engine 102 can be of any appropriate type and/or manufacture. For example, the Agilent 2030 can be used for the optical tracking engine 102 whereas the Analog Devices ADXC202 manufactured by Agilent Inc. of can be used for the accelerometer. In the described embodiment, the microcontroller unit 106 is connected to or has incorporated therein, a wireless transmitter unit 108. It should be noted that although the wireless transmitter unit 108 is configured as a Bluetooth based radio transmitter unit, any appropriate wireless transmitter can be used.

A surface detector 110 continuously monitors a number of surface related parameters in order to assure that the computer mouse 100 is in physical contact with a suitable surface. By suitable surface it is meant a surface that is free, or mostly free, of substantial surface irregularities, substantially planar, and substantially parallel to the local surface of the earth. In some embodiments, the computer mouse 100 includes (but not shown in FIG. 1) an acceleration monitor that is used to determine that the computer mouse 100 is in an inertial reference frame (i.e., not accelerated) such that in an non-inertial reference frame (such as a moving vehicle), the computer mouse 100 accommodates for the externally applied acceleration that is independent of the computer mouse acceleration generated by a computer user.

In the described embodiment, whenever the mouse 100 is determined to be on a suitable surface, the accelerometer 104 is in an active state thereby providing a stream of acceleration (dv/dt) data to the microcontroller 106. It should be noted at this point, that since the accelerometer 104 provides tracking information in the form of acceleration (in Cartesian coordinates, $d^2Y/dX^2$), an integration operation is performed on the acceleration data that converts the acceleration data to velocity data (dY/dX) appropriate for use as the dead reckoning tracking information. In those situations where the mouse 100 has either just been placed on a suitable surface or is restarting from a stopped position or is being powered up, the optical tracking engine 102 is activated in order to provide a calibration datum used to calibrate the dead reckoning tracking information provided by the accelerometer 104.

Using both the optical tracking datum and the associated dead reckoning tracking information, the microcontroller 106 determines if the optical tracking engine 102 remains active in order to provide the appropriate tracking information to the computer 112 by way of the wireless transmitter 108. It should be noted that the tracking information provided to the computer 112 is in fact velocity data (which can be in units of counts, or dots, moved per report that can be approximately 8 msec) which ultimately undergoes an integration operation at the computer 112 from velocity to position before being used to place a cursor 114 on an associated display screen 116.

In the described embodiment, the determination of the source of tracking information sent to the computer 112 is based upon a dead reckoning tracking error value E calculated by comparing the optical tracking datum and the associated dead reckoning tracking information at a particular point in time. If the dead reckoning tracking error value E is greater than a pre-determined error threshold $E_{thresh}$, then the microcontroller 106 directs the optical tracking engine 102 to 1) remain active using a duty cycle signal S provided thereto and 2) to provide the relevant tracking information to the computer 112. It should be remembered that even though the accelerometer 104 is not providing the tracking information to the computer 112, the accelerometer 104 is nonetheless still active and providing dead reckoning data at periodic intervals. In this way, the accelerometer 106 is always ready to take over from the optical tracking engine 102 when directed by the microcontroller 106.

Whenever the optical tracking engine 102 is active, the microcontroller 106 determines the dead reckoning tracking error value E for each of a number of periodic intervals. These periodic intervals may be based upon the report rate of the accelerometer 104 to provide valid dead reckoning tracking information and the processing specs of the microcontroller and typically is on the order of 10 msecs. In the described embodiment, the dead reckoning tracking error E is used to reset an offset value G associated with the accelerometer 104. As well known in the art, the offset value G for an accelerometer is that value representative of a bias value around which the particular accelerometer operates. Thereby, resetting the offset value G provides a simple way of compensating the output of the accelerometer in order to account for systemic errors that may adversely affect the accuracy of the accelerometers readings. Such systematic errors are typically related to process variations in the manufacture of the accelerometer itself as well as to the differences with mounting in the mouse chassis.

One error is referred to as accumulated error resulting from the differences in velocities observed by the accelerometer and the optical tracking engine for the same mouse motion. This difference in velocity measurement is due, in part, to the fact that the accelerometer and the optical tracking engines react very differently to the same external conditions, such as high/low acceleration, surface quality, etc. This error is present at one degree or another for each velocity data point provided by both the accelerometer and the optical tracking engine.

Accordingly, since the tracking information provided by to the computer 112 is integrated in order to arrive at a coordinate value (i.e., X, Y), any associated dead reckoning tracking error will also be integrated potentially resulting in substantial error in placement of the cursor 114. Therefore, it is important to reduce the accumulated tracking error as much as possible. In one embodiment, the tracking error for each interval is calculated and used to reset the offset value G for the accelerometer 104 having the effect of reducing the accumulated tracking error by "closing the gap" between the dead reckoning tracking information and the optical tracking information resulting in a commensurate reduction in any positional error in placement of the cursor 114.

In those situations, where the observed dead reckoning tracking error is less than the dead reckoning tracking error threshold $E_{thresh}$, the microcontroller 106 adjusts the duty cycle signal S to as to deactivate the optical tracking engine 102. In this way, the tracking information provided to the computer 112 is formed of only the dead reckoning tracking information provided by the accelerometer 104. In this way, by turning off the high power consumption optical tracking engine 102, the power consumed by the computer mouse 100 is substantially reduced. It should be noted, however, that since the accelerometer 104 is susceptible to any number of sources of error (some of which are described above), at periodic calibration intervals, the microcontroller 106 adjusts the duty cycle signal S in such a way that the optical tracking engine 102 is activated for a period of time sufficient to provide a calibration datum. This calibration datum is then used to calibrate associated dead reckoning tracking information associated of the same time interval. Again, the results of this comparison will determine whether or not the computer mouse 100 remains in hybrid mode (i.e., with only the accelerometer 104 providing the tracking information to the computer 112) or reverts to an optical tracking active mode whereby the tracking information is provided solely by the optical tracking engine 102 with the concomitant increase in power consumption.

It should be noted, that at any time the surface sensor 110 has determined that the mouse 100 is not in physical contact with a suitable surface, the mouse 100 ceases sending tracking information to the computer 112 until such time as the mouse 100 has been placed back on a suitable surface. In some cases (though not shown in FIG. 1), a tilt sensor can be incorporated into the mouse 100 to monitor the tilt of the mouse 100. Since any tilting of the mouse 100 from vertical can substantially affect the accuracy of the accelerometer 104, the tilt monitor provides real time feedback that can be used to modify the accelerometer 104 operation. It is contemplated that in one implementation, a series of contact sensitive feet placed between a surface and the mouse 100 can be use as such a tilt monitor. By measuring and comparing signals from each of the feet, the microcontroller 106 can determine relative tilt angle, if the mouse is on a valid surface, and adjust the signals from the accelerometer 104 accordingly.

Figure 2:
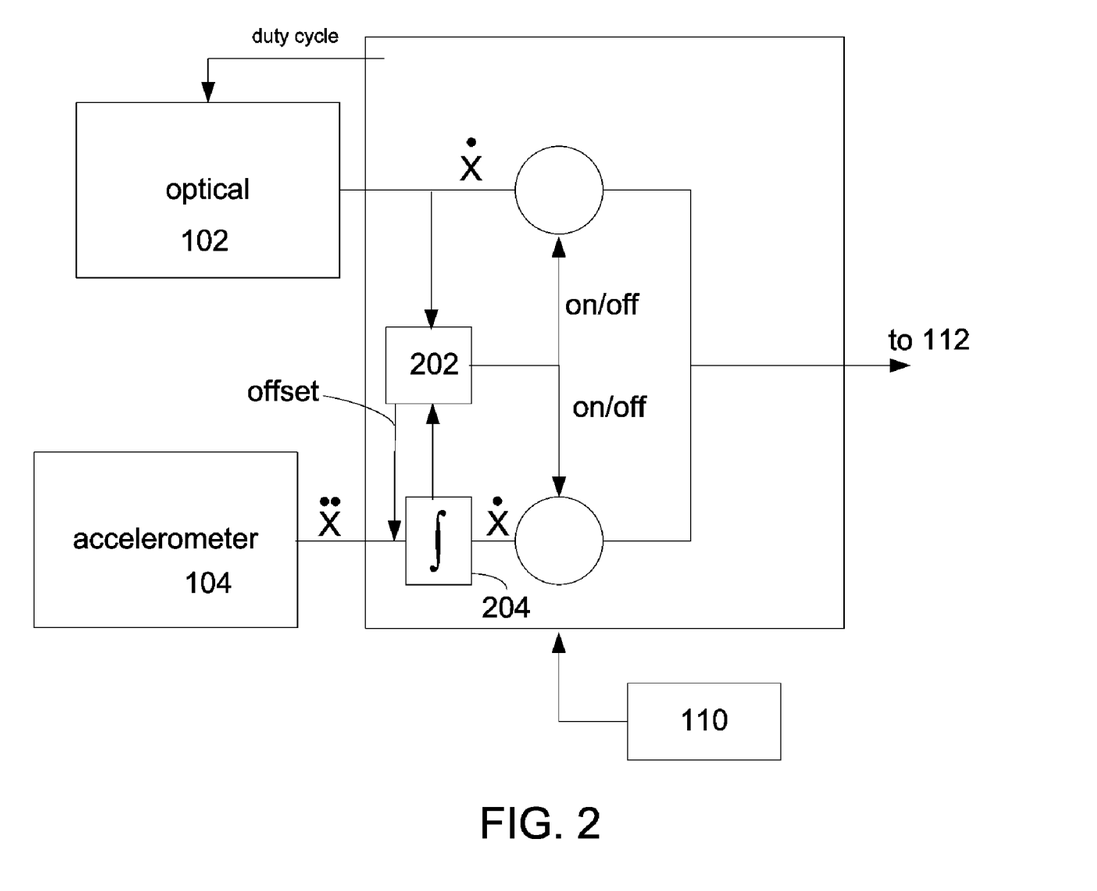
FIG. 2 shows a functional block diagram of a representative microcontroller suitable for use in the computer mouse in accordance with an embodiment of the invention.

FIG. 2 shows a functional block diagram of a representative microcontroller 200 suitable for use in the computer mouse 100 in accordance with an embodiment of the invention. It should be noted that the microcontroller 200 is merely an example of any of a number of possible implementations that could be used for the computer mouse 100 and should not be construed as limiting either the intent or scope of the invention. Accordingly, the microcontroller 200 includes a dead reckoning tracking error generator 202 coupled to the optical tracking engine 102 and an integrator 204 arranged to receive output data directly from the accelerometer 104 (as acceleration data).

As mentioned above, since the accelerometer 104 directly generates acceleration data, the acceleration data must be integrated to acceleration velocity data (i.e., dead reckoning tracking information) in order to be compared the velocity data provided by the optical tracking engine 102 (i.e., optical tracking information). Therefore, once the acceleration data has been appropriately integrated to form the dead reckoning tracking information, the dead reckoning tracking information error generator 202 determines the dead reckoning tracking information error E by comparing the optical tracking information provided by the optical tracking engine 102 and the dead reckoning tracking information provided the by accelerometer 104 (by way of the integrator 204) for each of a number of time intervals. In the case where the dead reckoning tracking information error E is less than a predetermined threshold $E_{threshold}$, the dead reckoning tracking error generator 202 adjusts the duty cycle signal S to deactivate the optical tracking engine 102 such that the only source of tracking information provided to the computer 112 is from the accelerometer 104. By de-activating the optical tracking engine 102, the overall power consumption of the computer mouse 100 is greatly reduced thereby providing a commensurate increase in probable battery life for battery powered computer mice.

However, in those cases where the dead reckoning tracking error E is greater than the threshold $E_{threshold}$, then the dead reckoning tracking error generator 202 adjusts the duty cycle signal S to activate the optical tracking engine 102 in such a way that the only source of tracking information to the computer 112 is that provided by the optical tracking engine 102. In this mode, however, at each time interval, the dead reckoning tracking error generator 202 compares the optical tracking datum to an associated dead reckoning tracking datum in order to ascertain a corresponding dead reckoning tracking information error E for each interval to form the accumulated tracking error discussed above that is used to update the accelerometer offset value G in order to reduce accumulated positional error of the cursor 114.

Figure 3:
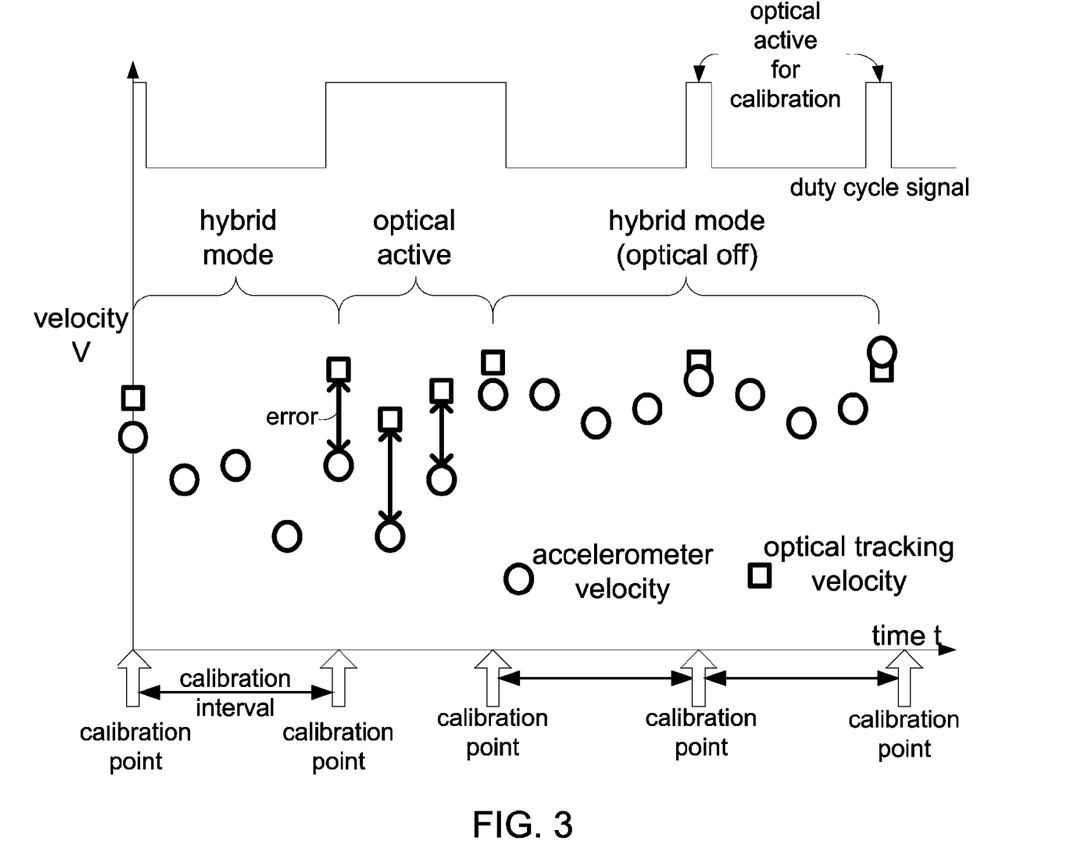
FIG. 3 is a graphical illustration of a representative operational cycle of the computer mouse in accordance with an embodiment of the invention.

FIG. 3 is a graphical illustration of a representative operational cycle 300 of the computer mouse 100 in accordance with an embodiment of the invention. For ease of discussion, the cycle 300 is illustrated using an XY graph having an X axis representing a time dimension (t) and a Y axis representing Velocity (V). For the remainder of this discussion, both the dead reckoning tracking information and the optical tracking information will be described in terms of accelerometer velocity Vacc and optical velocity Vopt.

Therefore, at an initial time interval, the optical tracking engine 102 is active and provides the optical velocity Vopt1 while the accelerometer 104 and integrator 204 provides the accelerometer velocity Vacc1. It should be noted that this initial time interval is representative of those situations where the computer mouse 100 is restarting from a stopped or otherwise inactive state. Such states can be due to the mouse 100 being powered up for the first time, being replaced upon a suitable surface after having been lifted off the surface, etc. Therefore, in order to provide an initial calibration point, the optical tracking engine 102 is activated. The initial calibration point (in this case, Vopt1) is used to compare to the accelerometer velocity Vacc1 and based upon this comparison, the optical tracking engine 102 is either de-activated (as in this example) or remains active.

In order to maintain close correlation between the accelerometer 104 and the optical tracking engine 102, a calibration operation is performed at regular intervals, referred to as a calibration interval. A typical calibration interval is approximately 80 ms during which the accelerometer 104 is calibrated against the optical tracking engine 102. In the situation shown in FIG. 3, the initial calibration indicates that the accelerometer 104 and the optical tracking engine 102 produce velocity values that are within an acceptable range. Accordingly, the computer mouse 100 is in the hybrid mode where the optical tracking engine 102 is deactivated and the accelerometer 104 is sending the appropriate tracking information to the computer 112. At a next calibration point C1, the optical tracking engine 102 is activated just prior to the calibration point C1 (in order for the optical tracking engine 102 to produce valid velocity data). A calibration check between the accelerometer 104 and the optical tracking engine 102 indicates a difference in the two velocities of such a magnitude that the optical tracking engine 102 takes over sending the tracking information to the computer 112 in place of the accelerometer 104. It should be noted, however, that for each of a number of intervals, a comparison between the accelerometer 104 and the optical tracking engine 102 is performed until such time as the measured error between the two velocities is deemed acceptable. Once the error is deemed acceptable, the computer mouse 100 is returned to hybrid mode by deactivating the optical tracking engine 102 such that the accelerometer 104 only provides the tracking information to the computer 112.

Also shown in FIG. 3 is a representative duty cycle signal S illustrating the adaptive nature of the inventive computer mouse 112. It should also be noted, that whenever a calibration operation is performed, the optical tracking engine 102 must be activated in order to provide the appropriate calibration velocity for an amount of time required for the optical tracking engine 102 to provide valid data.

Figure 4:
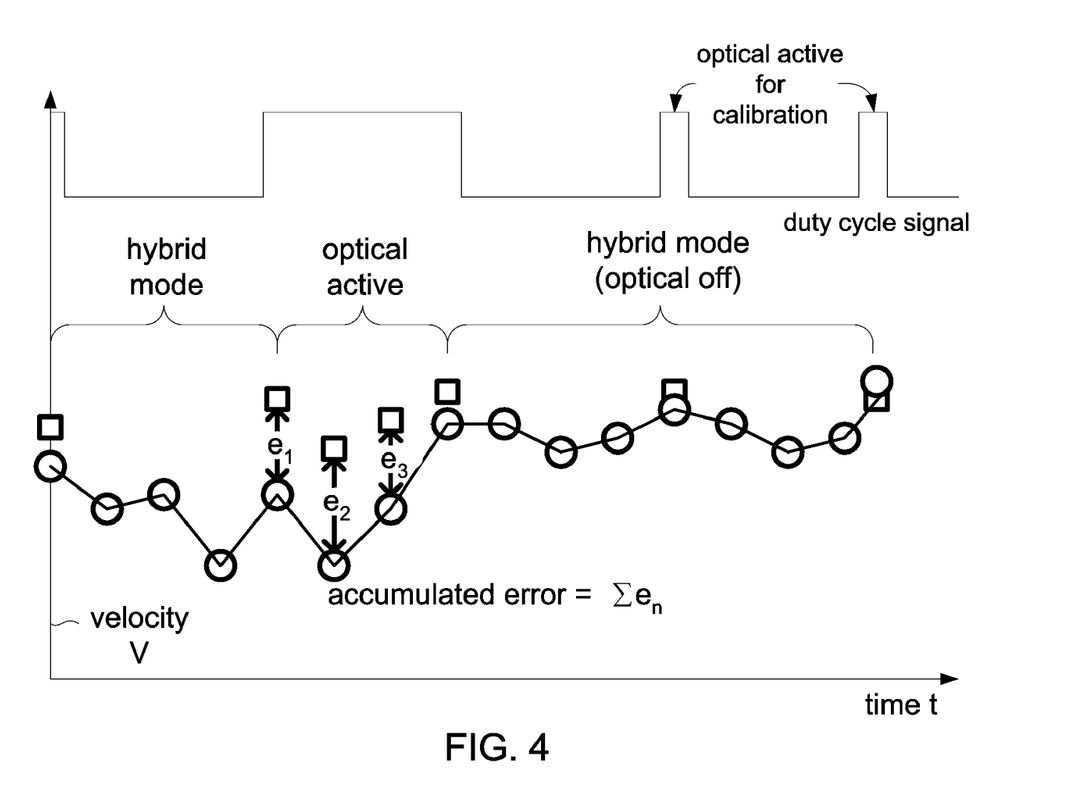
FIG. 4 shows accumulated error in accordance with an embodiment of the invention.

Referring to FIG. 4, the source of accumulated error as the result of a summation (or integration) of the individual error points is illustrated. For example, errors e1, e2, and e3 are summed during a subsequent integration operation used to transform the velocity data to position data by the computer 112. Therefore, reducing the gap between the accelerometer velocity curve 402 and the optical tracking engine velocity curve 404, the accumulated error is also reduced. This reduction in accumulated error has the beneficial effect of reducing positional error experienced by the cursor 114.

Figure 5:
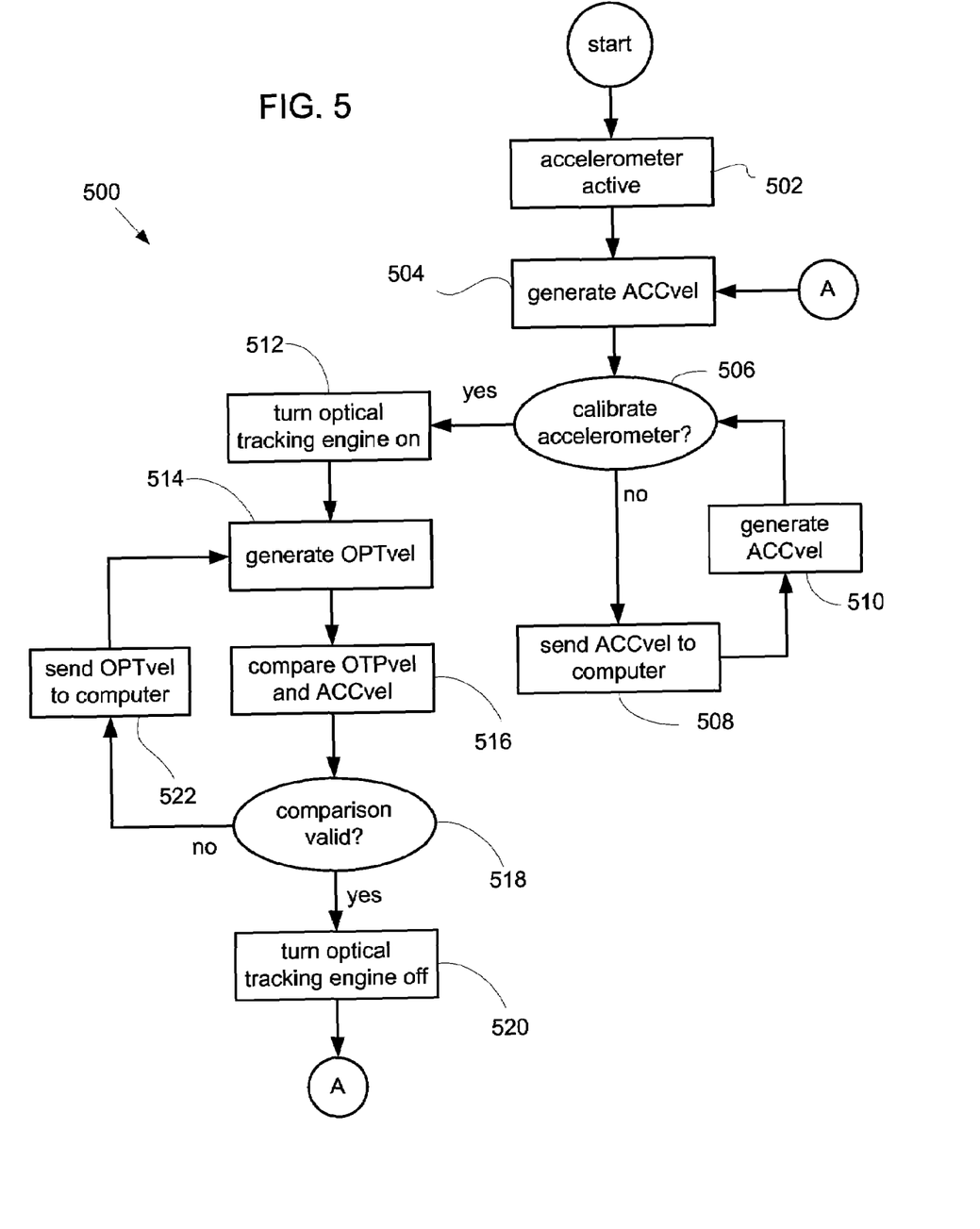
FIG. 5 is a flowchart detailing a process for operation of a hybrid computer mouse having an accelerometer and an optical tracking engine that cooperate to provide tracking information to computer.

FIG. 5 is a flowchart detailing a process 500 for operation of a hybrid computer mouse having an accelerometer and an optical tracking engine that cooperate to provide tracking information to computer. It should be noted that although not specifically shown in FIG. 5, a surface sensor is continuously monitoring various parameters referred to collectively as surface quality to assure that the computer mouse remains in physical contact with a suitable surface. Therefore, if at anytime the surface sensor determines that the computer mouse is not in physical contact with a suitable surface, the tracking data becomes zero until such time as it is again placed upon a suitable surface.

Accordingly, the process 500 begins at 502 by activating the accelerometer. It should be noted that the accelerometer remains active at all times except for those periods of time when the mouse is not active. At 504, the accelerometer generates a velocity value. It should be noted, that the process 500 is predicated upon the assumption that the computer mouse has already been initialized in that the accelerometer has been calibrated to the optical tracking engine and is therefore not explicitly shown. Nonetheless, it should be understood that the initialization process is performed whenever the mouse is restarted, powered up, or replaced upon a suitable surface. At 506, a determination is made whether or not the accelerometer requires calibration. Typically, this determination is based upon specific calibration intervals that are based upon any number of factors that include specific accelerometer manufacturer and model, environmental factors such as observed surface quality, etc.

If it is determined that the accelerometer does not require calibration, then the current accelerometer velocity value is sent to the computer at 508 and a new accelerometer velocity value is generated by the accelerometer at 510 after which control is again passed to 506 for a determination of calibration. If it is determined that calibration is required, then the optical tracking engine is activated at 512. Once the optical tracking engine is activated, an optical tracking engine velocity value is generated at 514 providing a calibration datum to be used to calibrate the accelerometer velocity value. At 516, the current accelerometer velocity value is compared to the optical tracking velocity value and if at 518 the comparison is determined to be valid the optical tracking engine is deactivated at 520. By the comparison being valid it is meant that the difference between the two velocity values are within a pre-selected range indicating that the accelerometer and the optical tracking engine agree to within acceptable limits.

If, on the other hand, the comparison is not valid, then the optical tracking engine remains active and the current optical tracking engine velocity value is sent to the computer at 522 and a new optical tracking velocity value is provided at 516. Therefore, the optical tracking engine remains active until such time as the comparison is valid at which time the optical tracking engine is turned off allowing only the accelerometer to provide the tracking information to the computer.

Figure 6:
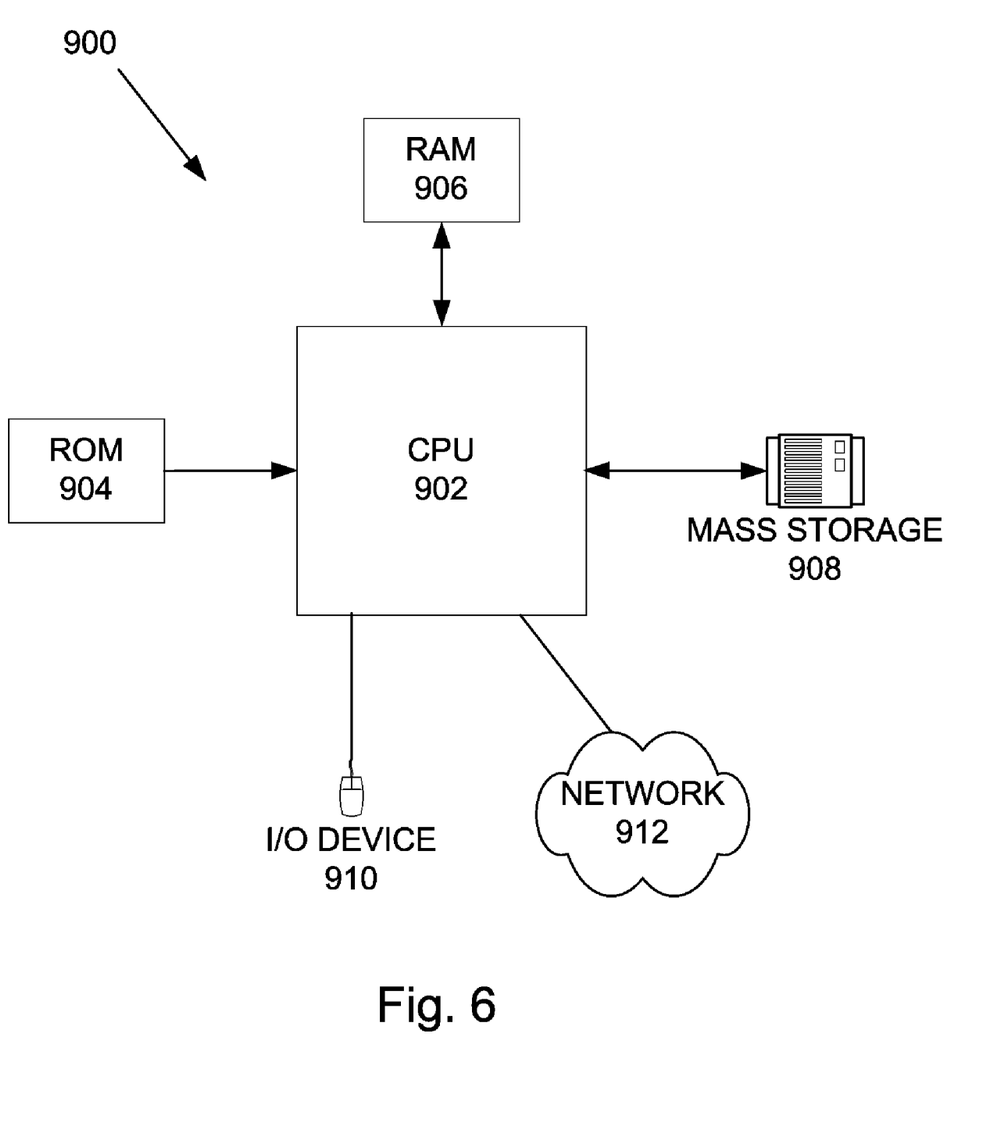
FIG. 6 illustrates a computer system employed to implement the invention.

FIG. 6 illustrates a computer system 900 employed to implement the invention. The computer system 900 or, more specifically, CPU 902, may be arranged to support a virtual machine, as will be appreciated by those skilled in the art. As is well known in the art, ROM acts to transfer data and instructions uni-directionally to the CPU 902, while RAM is used typically to transfer data and instructions in a bi-directional manner. CPU 902 may generally include any number of processors. Both primary storage devices 904, 906 may include any suitable computer-readable media. A secondary storage medium 908, which is typically a mass memory device, is also coupled bi-directionally to CPU 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPU 902.

CPU 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network, e.g., an Internet network or an intranet network, using a network connection as shown generally at 912.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

The invention claimed is:

1. A method for operating a pointing device in a low power manner, comprising:
   receiving first tracking information from a first tracking device;
   periodically determining accuracy of the first tracking information by a microcontroller; and
   activating and using a second racking device to acquire second tracking information when said determining indicates the accuracy of the first tracking information is inadequate, wherein the first tracking device is substantially lower power device that the second tracking device.

2. A method as recited in claim 1, further comprising:
   deactivating the second tracking device when said determining indicates that the accuracy of the first tracking information is adequate.

3. A method as recited in claim 1, wherein the first tracking device is an accelerometer and wherein the second racking device is an optical tracking engine.

4. A method as recited in claim 1, wherein the pointing device further includes a surface sensor.

5. A method as recited in claim 3,
   calibrating the accelerometer using a calibration value provided by the optical tracking engine.

6. A method as recited in claim 5, wherein when the accelerometer is only providing the tracking information to the computer, the power consumption of the computer mouse is substantially reduced as compared to the power consumption when the optical tracking engine is only providing the tracking information to the computer.

7. A method as recited in claim 5, wherein the calibrating comprises:
   resetting an accelerometer offset value based upon the calibration.

8. A method as recited in claim 7, further comprising:
   reducing an accumulated error value of the accelerometer based upon the resetting.

9. A hybrid tracking system suitably arranged to provide tracking information to a computer, comprising:
   an optical tracking engine arranged to provide the tracking information to the computer;
   a low power inertial tracking engine arranged to provide the tracking information to the computer, and
   an adaptive duty cycle signal generator coupled to the optical tracking engine and the inertial tracking engine arranged to compare tracking information provided by the low power inertial tracking engine and provided by the optical tracking engine such that when the comparison is valid, the adaptive duty cycle signal generator provides a first duty cycle signal that deactivates the optical tracking engine such that only the low power tracking engine provides the tracking information to the computer.

10. A tracking system as recited in claim 9, wherein when the comparison is determined to be not valid, the adaptive duty cycle generator provides a second duty cycle signal that activates the optical tracking engine such that only the optical tracking engine provides the tracking information to the computer.

11. A tracking system as recited in claim 9 wherein the hybrid tracking system is associated with a computer mouse.

12. A tracking system as recited in claim 9, wherein the inertial tracking sensor is an accelerometer that provides a measure of mouse acceleration and mouse velocity.

13. A tracking system as recited in claim 11, wherein the adaptive duty cycle depends upon mouse velocity, or mouse acceleration, or a surface quality associated with a surface upon which the mouse is in contact.

14. A tracking system as recited in claim 13, further comprising:
a surface sensor arranged to observe a number of surface quality parameters and determined, based upon the observed surface quality parameters, if the mouse is in physical contact with a suitable surface.

15. A tracking system as recited in claim 13, wherein when the surface sensor determines that the mouse in not in physical contact with a suitable surface, then the surface sensor causes the mouse to deactivate by deactivating both the optical tracking engine and the accelerometer.

16. A tracking system as recited in claim 10, wherein when the optical tracking system is only providing the tracking information, the accelerometer provides corresponding accelerometer based velocity values each of which are compared to each other to provide an error value.

17. A tracking system as recited in claim 16, wherein a number of error values are combined to form an accumulated error value.

18. A tracking system as recited in claim 17, wherein the accumulated error value is used to reset an offset value for the accelerometer.

19. A tracking system as recited in claim 18, wherein the reset offset value reduces the accumulated error thereby commensurable reducing positional error at the computer.

20. A tracking system as recited in claim 9, wherein the tracking system is in wireless communication with the computer.

21. Computer program product for operating a pointing device in a low power manner, comprising:
computer code for receiving first tracking information from a first tracking device;
computer code for periodically determining accuracy of the first tracking information by a microcontoller;
computer code for activating and using a second tracking device to acquire second tracking information when said determining indicates the accuracy of the first tracking information is inadequate, wherein the first tracking device is substantially lower power device that the second tracking device; and
computer readable medium for storing the computer code.

22. A computer program product as recited in claim 21, further comprising:
computer code for deactivating the second tracking device when said determining indicates that the accuracy of the first tracking information is adequate.

23. A computer program product as recited in claim 21, wherein the first tracking device is an accelerometer and wherein the second tracking device is an optical tracking engine.

24. A computer program product as recited in claim 21, wherein the computer mouse further includes a surface sensor.

25. A computer program product as recited in claim 23 comprising,
computer code for calibrating the accelerometer using a calibration value provided by the optical tracking engine.

26. A computer program product as recited in claim 25, wherein when the accelerometer is only providing the tracking information to the computer, the power consumption of the computer mouse is substantially reduced as compared to the power consumption when the optical tracking engine is only providing the tracking information to the computer.

27. A computer program product as recited in claim 25, wherein the computer code for calibrating comprises:
computer code for resetting an accelerometer offset value based upon the calibration.

28. A computer program product as recited in claim 27, further comprising:
computer code for reducing an accumulated error value of the accelerometer based upon the resetting.

29. A method for operating a pointing device having a surface sensor in a low power manner, comprising:
receiving first tracking information from a first tracking device;
periodically determining accuracy of the first tracking information by a microcontroller;
activating and using a second tracking device to acquire second tracking information when said determining indicates that the accuracy of the first tracking information is inadequate, wherein the first tracking device is substantially lower power device that the second tracking device;
determining if a surface is a suitable surface by the surface sensor; and
deactivating both the accelerometer and the optical tracking engine when it is determined that the surface is not a suitable surface.

30. A method as recited in claim 29, further comprising:
deactivating the second tracking device when said determining indicates that the accuracy of the first tracking information is adequate.

31. A method as recited in claim 29, wherein the first tracking device is an accelerometer and wherein the second tracking device is an optical tracking engine.

32. A method as recited in claim 31,
calibrating the accelerometer using a calibration value provided by the optical tracking engine.

33. A method as recited in claim 32, wherein when the accelerometer is only providing the tracking information to the computer, the power consumption of the computer mouse is substantially reduced as compared to the power consumption when the optical tracking engine is only providing the tracking information to the computer.

34. A method as recited in claim 33, wherein the calibrating comprises:
resetting an accelerometer offset value based upon the calibration.

35. A method as recited in claim 34, further comprising:
reducing an accumulated error value of the accelerometer based upon the resetting.

36. Computer program product for operating a pointing device having a surface sensor in a low power manner, comprising:
- computer code for receiving first trading information from a fast tracking device;
- computer code for periodically determining accuracy of the first tracking information;
- computer code for activating and using a second tracking device to acquire second tracking information when said determining indicates that the accuracy of the first tracking information is inadequate, wherein the first tracking device is substantially lower power device that the second tracking device;
- computer code for determining if a surface is a suitable surface by the surface sensor; and
- computer code for deactivating both the accelerometer and the optical tracking engine when it is determined that the surface is not a suitable surface; and
- computer readable medium for storing the computer code.

37. A computer program product as recited in claim 36, further comprising:
- computer code for deactivating the second tracking device when said determining indicates that the accuracy of the first tracking information is adequate.

38. A computer program product as recited in claim 36, wherein the first tracking device is an accelerometer and wherein the second tracking device is an optical tracking engine.

39. A computer program product as recited in claim 38,
- computer code for calibrating the accelerometer using a calibration value provided by the optical tracking engine.

40. A computer program product as recited in claim 39, wherein when the accelerometer is only providing the tracking information to the computer, the power consumption of the computer mouse is substantially reduced as compared to the power consumption when the optical tracking engine is only providing the tracking information to the computer.

41. A computer program product as recited in claim 39, wherein the computer code for calibrating comprises:
- computer code for resetting an accelerometer offset value based upon the calibration.

42. A computer program product as recited in claim 41, further comprising:
- computer code for reducing an accumulated error value of the accelerometer based upon the resetting.

* * * * *

UNITED STATES PATENT AND TRADEMARK OFFICE
CERTIFICATE OF CORRECTION

PATENT NO. : 7,154,477 B1 Page 1 of 1
APPLICATION NO. : 10/605042
DATED : December 26, 2006
INVENTOR(S) : Hotelling et al.

It is certified that error appears in the above-identified patent and that said Letters Patent is hereby corrected as shown below:

In line 7 of claim 1 (column 10, line 26) change "racking" to --tracking--.

In line 3 of claim 3 (column 10, line 38) change "racking" to --tracking--.

In line 4 of claim 36 (column 13, line 4) change "trading" to --tracking--.

In line 5 of claim 36 (column 13, line 5) change "fast" to --first--.

Signed and Sealed this

Fourth Day of September, 2007

JON W. DUDAS
*Director of the United States Patent and Trademark Office*